(12) United States Patent
Murray

(10) Patent No.: US 6,524,108 B2
(45) Date of Patent: Feb. 25, 2003

(54) THREE DIMENSIONAL FAMILY TREE

(76) Inventor: Robert C. Murray, 14618 Kitlanselt Way, Orlando, FL (US) 32828

( * ) Notice: Subject to any disclaimer, the term of this patent is extended or adjusted under 35 U.S.C. 154(b) by 0 days.

(21) Appl. No.: 09/824,439

(22) Filed: Apr. 3, 2001

(65) Prior Publication Data

US 2002/0172924 A1 Nov. 21, 2002

(51) Int. Cl.$^7$ .............................................. G09B 19/00
(52) U.S. Cl. ...................................................... 434/154
(58) Field of Search ................................ 434/154, 430, 434/365, 107; 40/729, 730

(56) References Cited

U.S. PATENT DOCUMENTS

| | | | | |
|---|---|---|---|---|
| 705,833 A | * | 7/1902 | Gee | 434/154 |
| 4,201,386 A | * | 5/1980 | Seale | 273/236 |
| 4,375,288 A | * | 3/1983 | Guertin | 273/273 |
| 4,483,680 A | * | 11/1984 | Daly | 434/154 |
| 4,650,422 A | * | 3/1987 | Gorczynski | 434/154 |
| 4,865,548 A | * | 9/1989 | Snyder | 434/154 |
| 5,246,374 A | * | 9/1993 | Boodram | 434/154 |
| 5,588,240 A | * | 12/1996 | Zilliox | 40/729 |

* cited by examiner

Primary Examiner—Derris H. Banks
Assistant Examiner—Kurt Fernstrom
(74) Attorney, Agent, or Firm—William M. Hobby, III

(57) ABSTRACT

A three dimensional family tree display has a plurality of family member blocks with each block having a plurality of edges and having a family tree member identification thereon. Each block has a plurality of openings therein and at least one edge of each block has a connected portion for connecting one edge of one block to one edge of a second block. Each pair of edge connected blocks being illustrative of the spousal relationship with the family members on each of the pair of edge connected blocks. A plurality of connecting tubes or rods are each attached to one opening in each of a pair of blocks to thereby connect the two blocks. The rod connected blocks being illustrative of the parent child relationship of the connected blocks. A base supports a plurality of attached blocks so that a family tree is displayed in a three dimensional display. Each block can have a family name as well as photographs of the family member thereon. Each block edge connecting portion can be a tongue and groove connector for connecting two blocks together.

6 Claims, 4 Drawing Sheets

THREE DIMENSIONAL FAMILY TREE

BACKGROUND OF THE INVENTION

This invention pertains to a family tree display and more specifically to a three dimensional display of a persons family tree.

In the past, there have been genealogical charts and organizers to track genealogical data and information. These charts become crowded or unbalanced when one couple has many children and require long lines onto other pages to connect to the next family member. They also do not allow the addition of in-laws and do not make good decorative displays or allow for photographs. These types of charts can be seen in U.S. Patents to: Daly, U.S. Pat. No. 4,483,680; Gray, U.S. Pat. No. 1,058,859; Guild, U.S. Pat. No. 699,799; and Griswold, U.S. Pat. No. 4,501,559. There are existing designs for wall plaques as seen in Pat. Nos. Des. D133,068; D148,388; D159,444; and D214,733. These wall plaques to not hold pictures, engravers names, or show family positions.

There are games to teach children about family relationships. In the game board shown in the U.S. Patents to Guertin, U.S. Pat. Nos. 4,375,288 and 2,733,112, there is a picture of a tree with pictures of couples around the outside. It stands by itself but is a single two-dimensional piece. There are no family connections shown on the tree. The games teach how to investigate your heritage. The pictures are not of your own family.

There are family tree name plaques, as shown in the U.S. Patents to Berg U.S. Pat. No. D427,938 and Smith U.S. Pat. No. 265,643. The first of these is a wall hanging and does not show family relationships. The second contains small plaques for family members but not all relationships are shown. It cannot be expanded and neither patent contains pictures.

The three-dimensional doll house, shown in U.S. Patent to Gorczynski U.S. Pat. No. 4,650,422, shows family connections by hanging baskets from a branch and then splitting the branch into two branches with each holding baskets. There are dolls which can occupy the baskets. The pieces have a predetermined place so many relationships cannot be shown. Also, the dolls are not actual members of your own family. This patent can be used for teaching children about family relationships.

There are many styles of picture frames, as shown in U.S. Patents to Rosenberg, U.S. Pat. No. 2,593,195 and George, U.S. Pat. No. 4,794,716, none of which are close to the present invention. There is a kit of picture frames made up of leaves and hearts that connect to show many possible family relationships, as seen in U.S. Pat. No. 5,246,374 to Boodram. This patent is primarily for displaying pictures in their position to the family and in the form of a real plant. It displays the pictures in family groups with marriages in a heart and children as the leaves, but it is difficult to show other relationships, like in-laws, divorces, children from other marriages or adoptions. This patent also deals with two-dimensional wall hangings and puts family groups in a flowerpot. It is not made to stand on its own and it does not contain the name or birthdate of the individuals pictured.

The genealogy chain in the U.S. Patent to Gee, U.S. Pat. No. 705,833 is similar but has no pictures and does not stand on its own. The family tree mobile, in the U.S. Patent to Davis, U.S. Pat. No. 1,297,663, can show many family relationships including birth, marriage and death. However, it does not display pictures of the person and is for hanging only.

Finally, there is the three-dimensional genealogical display, shown in U.S. Pat. No. 4,865,548 to Snyder, which stands like a set of shelves. This invention is capable of holding a great number of markers which represent family members. It can easily show in-laws and their ancestors. Each marker is connected to its parents and children. But, this invention does not show photos or birthdates of the family members and this invention must be of large enough size to make it useful. This invention is primarily used to show positions in the family for many generations and large families.

It is the object of the present invention to be able to show many different family relationships to an individual. Unlike prior inventions, this invention can show divorces, adoptions, foster parents, group homes, in-laws, and anything else which a family or group would like to show.

SUMMARY OF THE INVENTION

A three dimensional family tree display has a plurality of family member blocks with each block having a plurality of edges and having a family tree member identification thereon. Each block has a plurality of openings therein and at least one edge of each block has a connected portion for connecting one edge of one block to one edge of a second block. Each pair of edge connected blocks being illustrative of the spousal relationship with the family members on each of the pair of edge connected blocks. A plurality of connecting tubes or rods are each attached to one opening in each of a pair of blocks to thereby connect the two blocks. The rod connected blocks being illustrative of the parent child relationship of the connected blocks. A base supports a plurality of attached blocks so that a family tree is displayed in a three dimensional display. Each block can have a family name as well as photographs of the family member thereon. Each block edge connecting portion can be a tongue and groove connector for connecting two blocks together.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
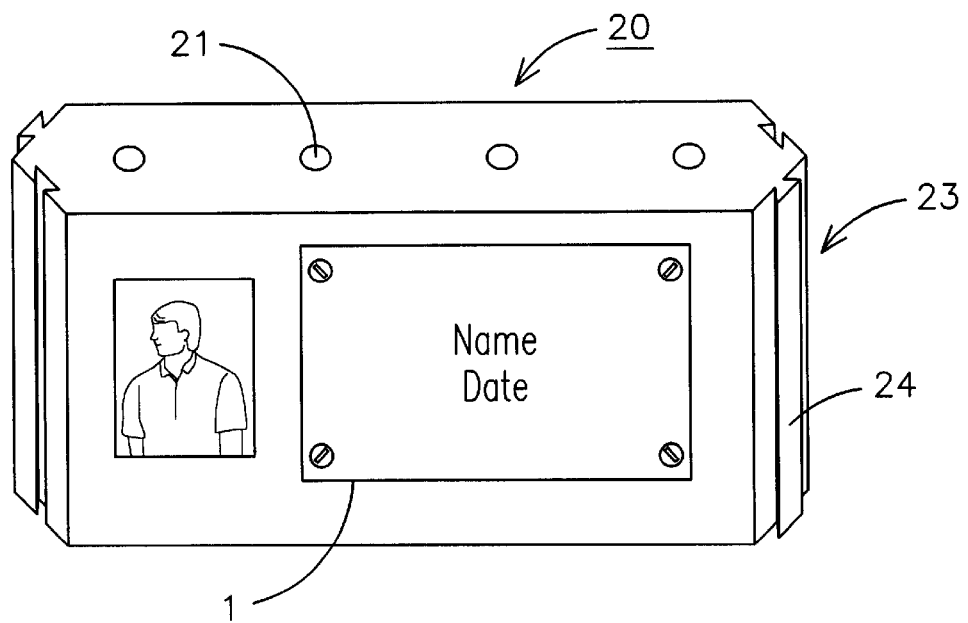
FIG. 1 is a perspective view of a block for use in the present invention.
Figure 2:
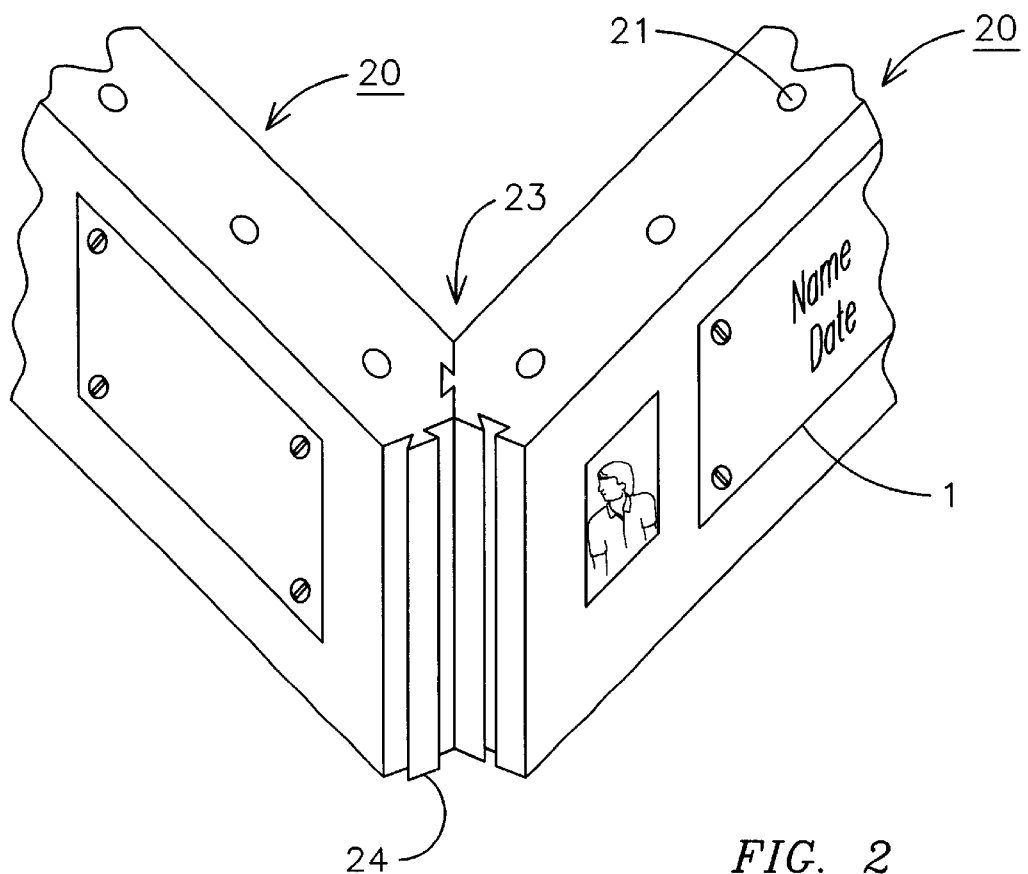
FIG. 2 is a partial perspective of two connected blocks indicating a marriage or partnership.

FIGS. 1 and 2 show a basic family tree block 20 which can hold a drawing or photograph or an engraved plaque with text on the front or back of the block. Block 20 has holes 21 drilled vertically in the top and bottom edges for attaching to other blocks via tubular or rod members 22. Blocks 20 can be made with as many holes as necessary. Each block 20 can be attached directly to another block along a vertical edge. The vertical edge connection 23 can be a tongue and groove joint 24 as shown or by short tubular members, by glue, or by any other means desired. This connection should be made in such a way that the blocks are touching each other to show a very close relationship as seen in FIG. 2.

Figure 3:
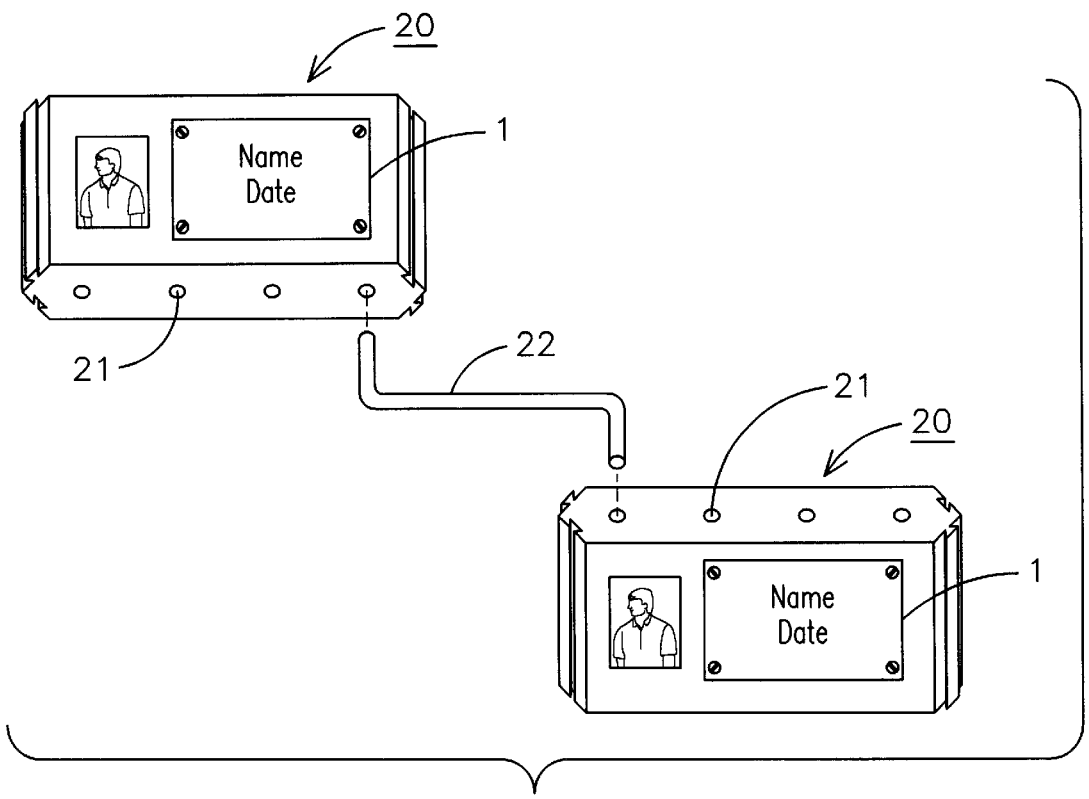
FIG. 3 is an exploded perspective of two blocks and a connector.

Connections between blocks are made via tubular members 22 of varying lengths. These tubular members can be inserted into the holes 21 along the top and bottom edges of the block. FIG. 3 shows the form of tubular members 22 and suggests how they attach to blocks 20. They attach by being inserted into the holes of the block. Once attached, the tubular construction allows for 360 degree rotation of either block. This is important to reduce crowding and preserve the balance of the structure.

Figure 4:
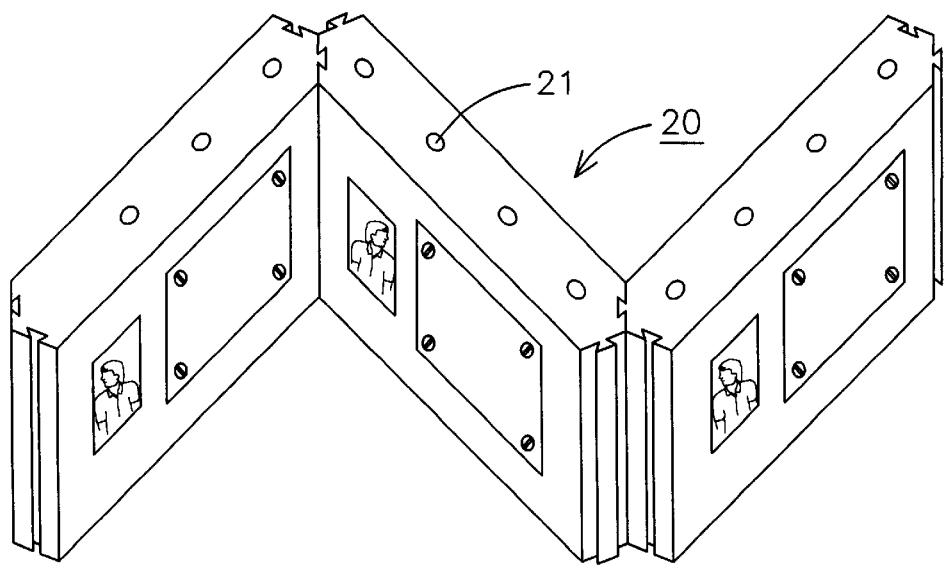
FIG. 4 is a perspective view of connected blocks showing how a married but separated couple could have a block between them.

If a married couple is separated but have children, a block can be placed in between the couple to hold the children's block as seen in FIG. 4.

Figure 6:
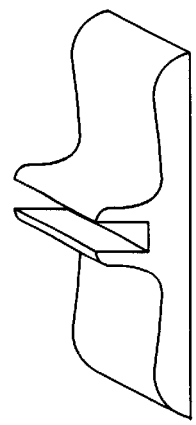
FIG. 6 is a perspective view of a base for the present structure.
Figure 7:
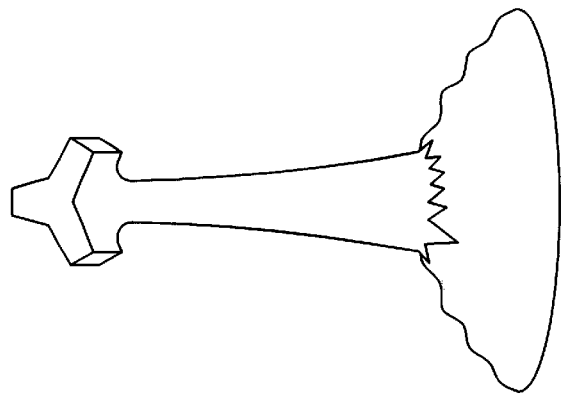
FIG. 7 is a perspective of a second embodiment of a base structure.
Figure 8:
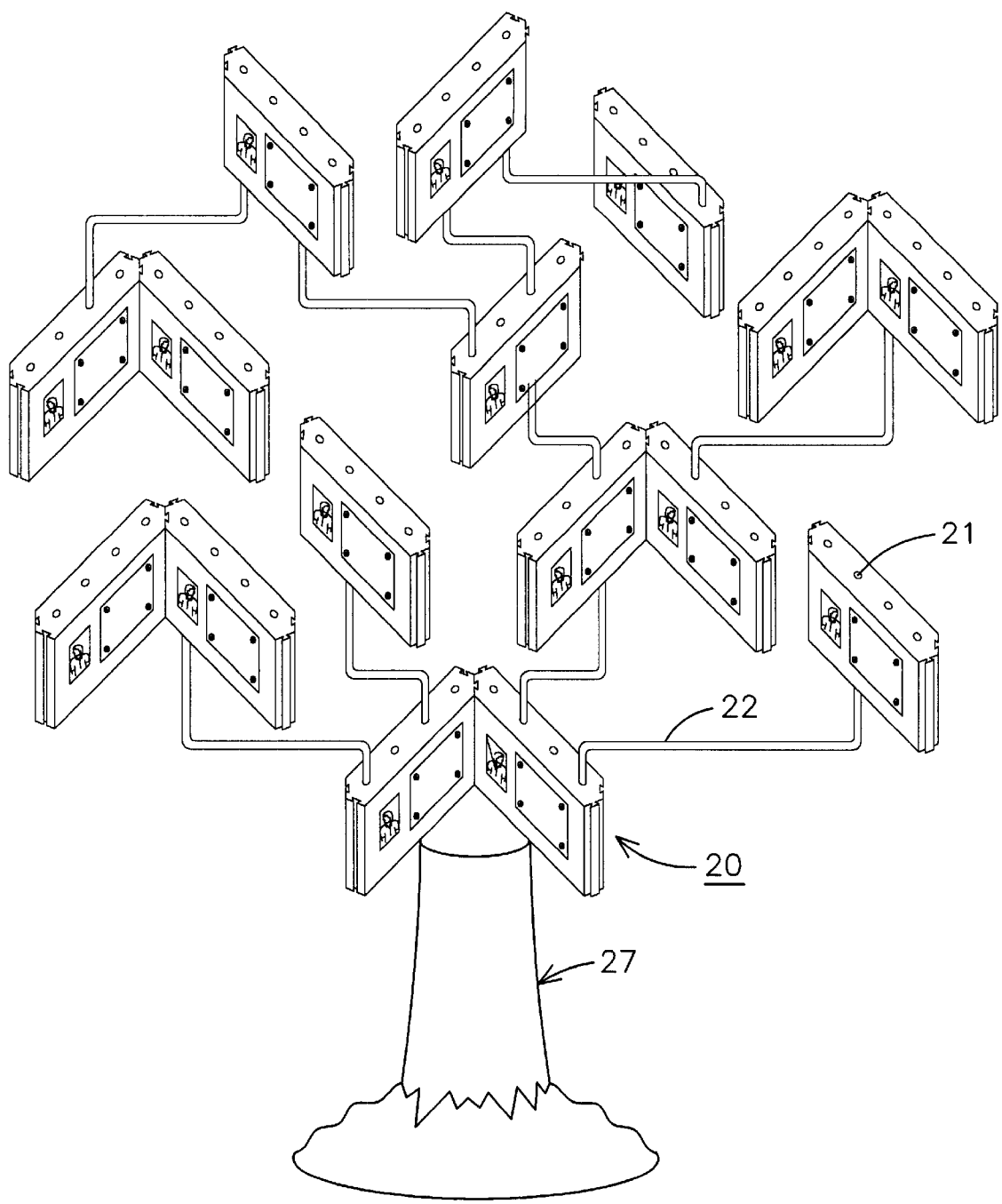
FIG. 8 is a perspective view of a family tree of blocks connected together sitting on a base.

The structure is placed on a base to keep it from falling over, such as seen in FIGS. 6, 7 and 8. The base can also be more ornamental as seen in FIG. 7.

Figure 5:
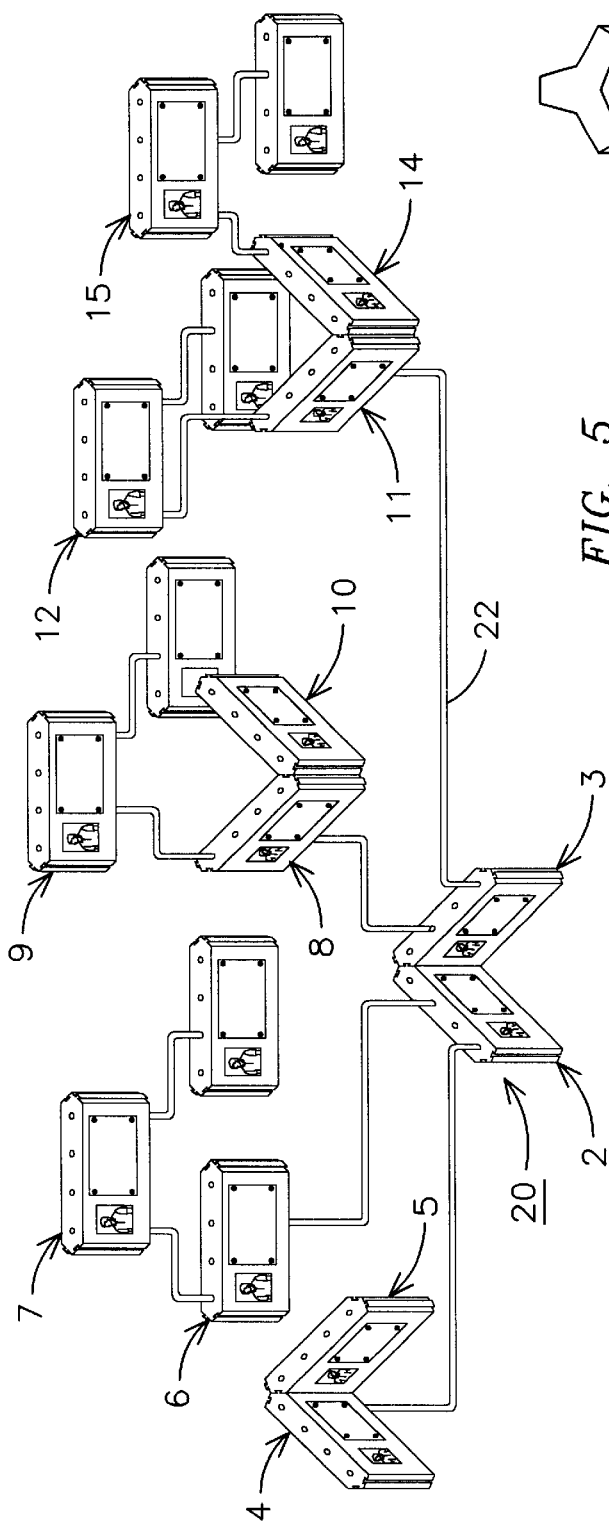
FIG. 5 is a perspective view of a family tree of connected blocks.

FIG. 5 shows the connection of a plurality of blocks 20 in a single structure, and FIG. 8 shows an entire family tree connected in a single structure on a base 27.

Construction of the blocks can be of any solid material which can have engraved plates attached to the front and back and a number of holes drilled in the top and bottom edges to have the elongated rod members 25 inserted. The blocks 20 should be sufficiently light so that more members can be put on the structure. The blocks should be finished in a way that is presentable for display in a home.

The elongated members 22 should be sufficiently strong to hold the weight of many blocks 20 without bending out of shape. The elongated members 22 should be attractive enough to be a part of the entire display.

The base 27 can be any object capable of holding the bottom block so it does not fall. It can take the shape of a building, a tree, a person, a car, or any object desired.

This three-dimensional system provides a representation of the real life relationships possible in a family or group. Any relationship can be represented or actually named on a plaque as needed.

For family use, as seen in FIG. 5, you start with the oldest (or youngest) known relative 2 and add a block for the spouse 3 (beside and connected). Next, four children have been added by connecting blocks to the parents. The child 4 on the left is married. The spouse's block 5 is connected to the right of the child's block. The next child 6 to the right is divorced, and the couple had one child 7. The next child 8 to the right is divorced and has one child 9, and is remarried 10. The next child 11 to the right is divorced and had one child 12 and is remarried 14. The new spouse 14 also has a child 15 from a previous marriage. Because of the way people are placed in the structure, they can be instantly seen as son, nephew, grandson, brother, half brother, and the like the moment their block is put into place. Ancestors of spouses extend upward or downward from the spouse. This structure can easily show separations, divorces and children from different parents. If the structure cannot easily show a relationship, it can be written on the plaque 1 of FIG. 1.

For business use, you can start with the president or leader's block, connect to each vice president's block, and to each in the next level of command. A school system could place the superintendent's block at the bottom and connect to five area superintendents' blocks. To each area superintendent's block, connect three blocks, one for high schools, one for middle schools, and one for elementary schools.

An ancestral tree would start with an individual's block at the bottom and branch upward to parents' blocks, grandparents' blocks, great grandparents' blocks, and so on.

I claim:

1. A three dimensional family tree display comprising:
    a plurality of family member blocks, each block having a plurality of edges and having a family tree member identification thereon, and each said block having a plurality of openings therein and at least one block edge connecting portion for connecting one of said plurality of blocks to another of said plurality of blocks, each said pair of edge connected blocks being illustrative of the spousal relationship of the family members on each of the pair of edge connected blocks;
    a plurality of block connecting rods, each said rod being attached into one opening in each of a pair of blocks to thereby connect the two blocks, said rod connected blocks being illustrative of the parent child relationship of the connected blocks; and
    a base for supporting said plurality of attached blocks; whereby a family tree is displayed in a three dimensional display.

2. The three dimensional family tree display of claim 1 in which a plurality of said family member blocks each has the name of the family member thereon.

3. The three dimensional family tree display of claim 2 in which a plurality of said family member blocks each has a photograph of the likeness of the family member named thereon.

4. The three dimensional family tree display of claim 2 in which each said block edge connecting portion for connecting one of said plurality of blocks to another of said plurality of blocks has one portion of a tongue and groove connection thereon.

5. The three dimensional family tree display of claim 4 in which each said block edge connecting portion for connecting one of said plurality of blocks to another of said plurality of blocks has both a tongue and a groove connecting portion thereon.

6. The three dimensional family tree display of claim 1 in which said blocks has front, side and bottom edges and said plurality of openings therein are located on the top and bottom edges thereof.

* * * * *